United States Patent [19]

Boeddeker et al.

[11] 4,315,633
[45] Feb. 16, 1982

[54] STORAGE CART FOR MUSIC STANDS

[75] Inventors: David R. Boeddeker, Medford; Wayne V. Tenner, Bloomington, both of Minn.

[73] Assignee: Wenger Corporation, Owatonna, Minn.

[21] Appl. No.: 178,129

[22] Filed: Aug. 13, 1980

[51] Int. Cl.³ .............................................. B62B 3/10
[52] U.S. Cl. ................................ 280/79.3; 211/60 R; D34/21
[58] Field of Search ................ 280/79.1 R, 79.1 A, 280/79.3, 33.99 T; 211/60 T, 60 R, 60 G, 66, 65, 162, 182; D12/22, 26, 29

[56] References Cited

U.S. PATENT DOCUMENTS

| D. 182,483 | 4/1958 | Skinner | D12/29 |
|---|---|---|---|
| D. 211,034 | 5/1968 | Mero | D33/14 |
| 1,543,501 | 6/1925 | Hiatt | 280/79.3 |
| 3,147,864 | 9/1964 | Sylvester | 211/24 |
| 3,210,091 | 10/1965 | Ng | 211/60 T |
| 3,897,876 | 8/1975 | Feldman | 211/27 |

*Primary Examiner*—David M. Mitchell
*Attorney, Agent, or Firm*—Wegner, Stellman, McCord, Wood & Dalton

[57] ABSTRACT

A storage cart for music stands having a column member extending upwardly from a base with a plurality of legs radiating from the base. The cart has upper and lower pairs of spaced-apart rods which are inclined along their length and which define an upright storage plane for one or more music stands with a stand column member positioned between the upper pair of rods and one of the legs of the stand extending downwardly between the lower pair of rods and with the pairs of rods having structure to cause the lowermost stand to maintain a generally upright storage position in the cart and with successive stands also being stored in generally upright position and along an incline.

10 Claims, 3 Drawing Figures

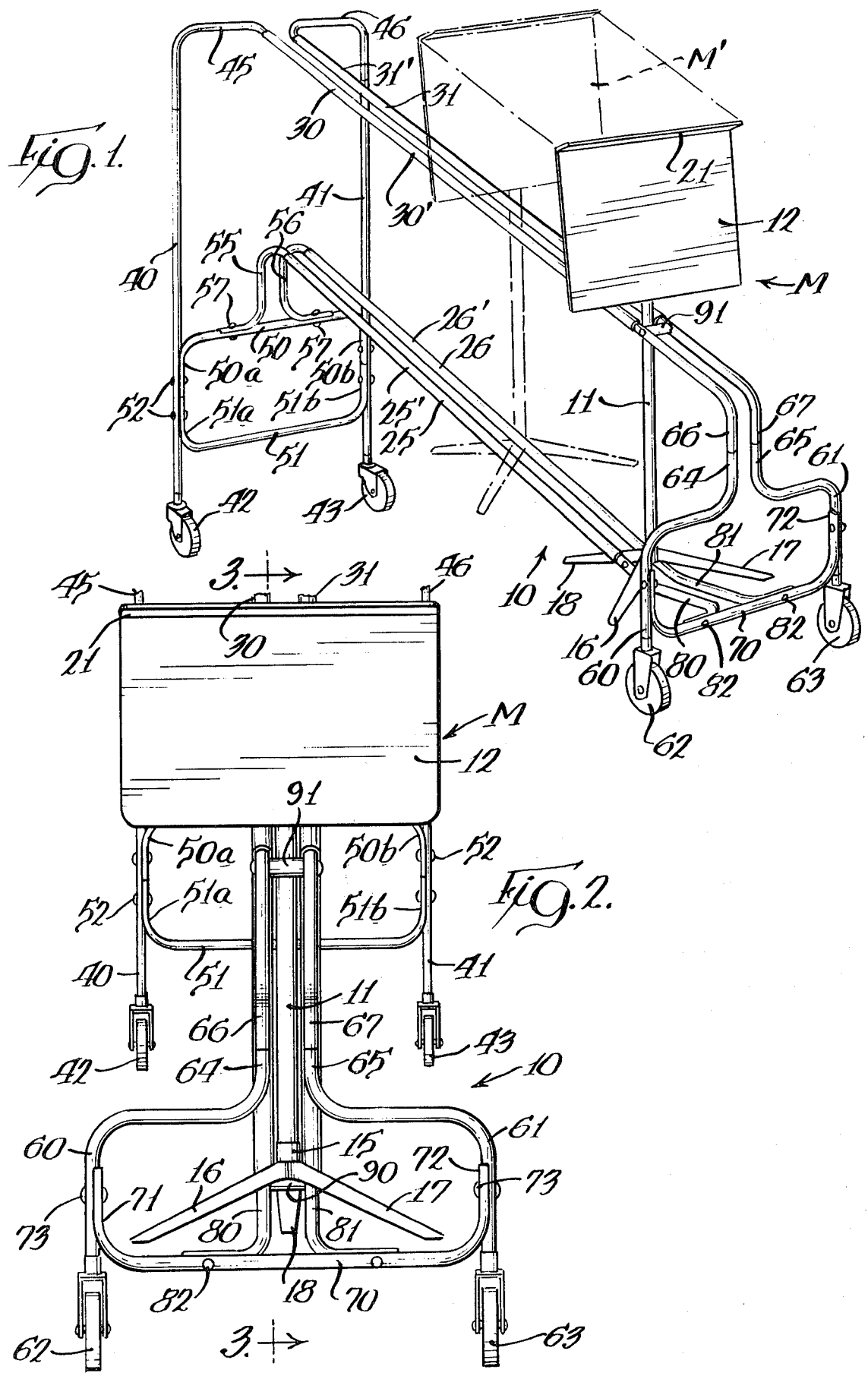

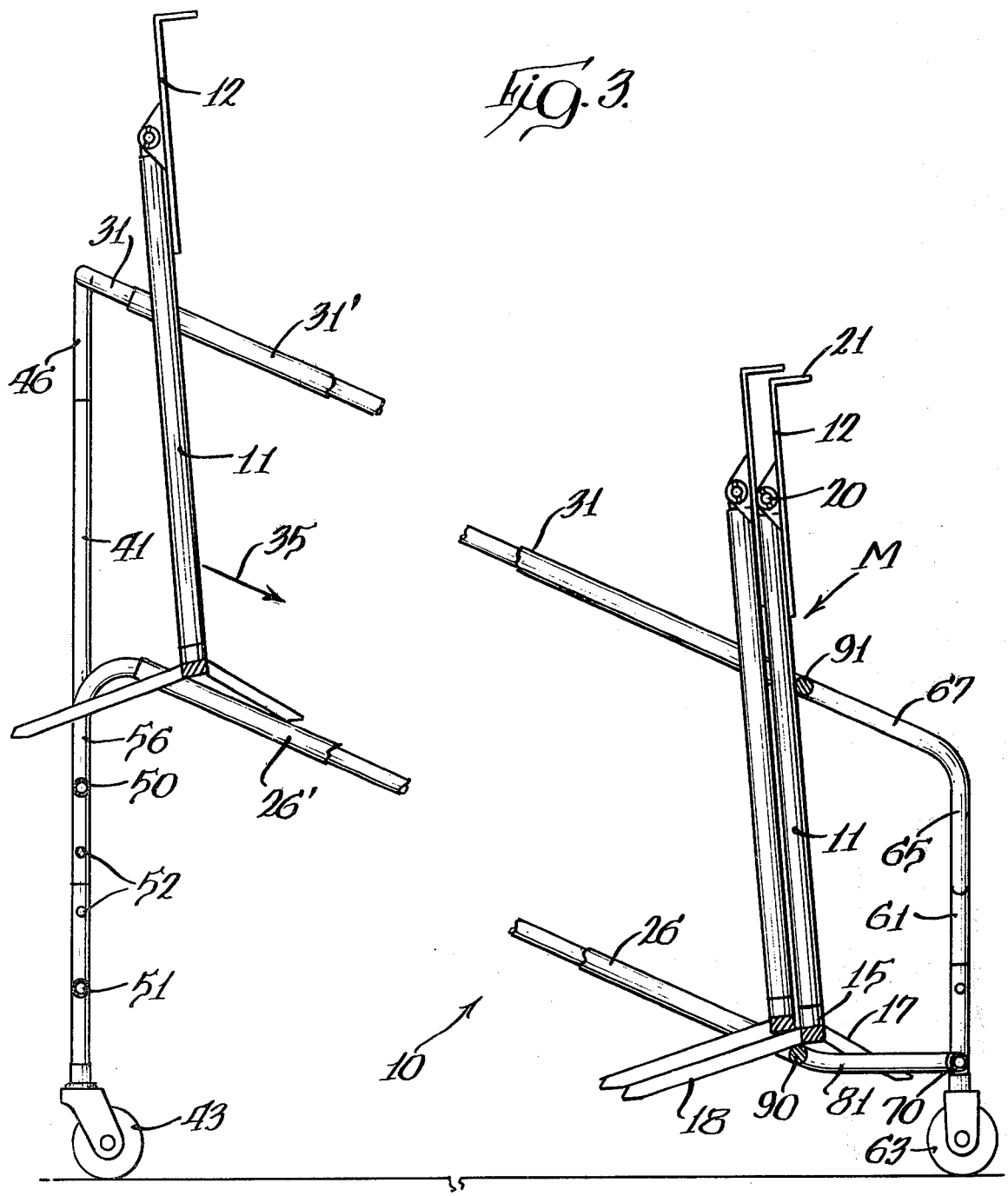

STORAGE CART FOR MUSIC STANDS

BACKGROUND OF THE INVENTION

This invention relates to a storage cart for music stands which supports a plurality of stands in generally upright position and along an incline to maximize the number of stands that can be stored within dimensions of the cart which enables the cart to clear doorways and enter small elevator depths.

An example of the known prior art is shown in Mero U.S. Pat. No. Des. D-211,034 wherein a storage cart can store a plurality of music stands. The prior art storage cart does not maximize the storage by supporting a plurality of generally upright stands along an incline, nor does it have structure for maximizing the nesting of the stands by upper and lower pairs of guide rods which define a storage plane and which coact with parts of the music stands to closely nest the stands. The over-all dimensions of the cart are greater than necessary to support the stands. This results in reducing the mobility of the cart as well as increasing the space required for storage of the cart and stands carried by the cart.

SUMMARY OF THE INVENTION

A primary feature of the storage cart disclosed herein is to provide for secure storage of a maximum number of music stands within certain storage cart dimensions whereby the cart may move through doorways and be carried by relatively small elevators. In carrying out the foregoing, a storage cart having an approximate length of five feet may store 18 to 24 music stands in generally upright position and along an incline. The lowermost stand has its legs a short distance above a floor and the uppermost stand in storage has its upper edge approximately five feet above the floor and with the width of the cart being approximately the same as the width of a music desk of the music stand. The cart and stands carried thereby may move through doorways and onto relatively small elevator platforms which facilitates delivery of the music stands to a desired location of use or storage.

Another primary feature of the invention is to provide a storage cart for music stands which supports music stands in generally upright position along an incline by means of upper and lower pairs of support members which coact with parts of the music stand to support the stands in nested relation and with the support members having an entry and exit end at one end of the cart which may be suitably locked and with the coaction between parts of the cart and the stands preventing removal of a stand from the cart except through the exit opening.

In carrying out the foregoing, the storage cart has a frame with a lower pair of spaced-apart rods extending lengthwise of the frame between ends thereof and inclined relative thereto, an upper pair of spaced-apart rods overlying the lower pair of rods and extending lengthwise of the frame and inclined relative thereto to be in parallel relation with the lower pair of rods. The pairs of rods have the space therebetween defining a vertical storage plane which is exposed to an end of the frame at the upper ends of the rods to permit entry of a music stand from an end of the frame into the storage plane with a column member of a music stand between the upper pair of rods and a leg of a music stand base extending downwardly between the lower pair of rods.

More particularly, the lower pair of rods of the storage cart are spaced apart a distance slightly greater than a leg of the music stand and are inclined upwardly at an angle of approximately thirty degrees (30°) and the upper pair of rods are spaced apart a distance slightly greater than the width of a column member of the music stand. A music stand is inserted from an end of the frame by placing the column member between the upper pair of rods and placing a leg of the music stand between the lower pair of rods with remaining legs of the music stand positioned above the lower pair of rods. Stop members extend between said pairs of rods near their lower ends to engage a lowermost stand stored in the cart and establish a generally upright position of the lowermost stand at a distance from the adjacent end of the cart.

Other features of the invention relate to the economical construction utilizing spaced pairs of vertical members at opposite ends of the frame for supporting rollers for cart mobility and providing mountings for said pairs of rods centrally of the width of the cart and the structure being designed whereby a pair of storage carts may be nested side by side by reversing the direction of one cart relative to the other and with slight offset therebetween bringing one laterally into nested relation with the other to thereby minimize storage space required for a plurality of the storage carts when they are not in use in storage of music stands.

BRIEF DESCRIPTION OF THE DRAWINGS

FIG. 1 is a perspective view of the storage cart showing one music stand in full line in the lowermost storage position and showing an additional music stand in broken line in an intermediate storage position;

FIG. 2 is a perspective view, looking downwardly toward an end of the cart shown at the right in FIG. 1; and FIG. 3 is a fragmentary vertical section, taken generally along the line 3—3 in FIG. 2.

DESCRIPTION OF THE PREFERRED EMBODIMENT

The music stand cart is indicated generally at 10 and is constructed for storage of a plurality of music stands. At least one music stand M is shown in association with the cart in the drawings. Each of the stands has a tubular column member 11 mounting a music desk 12 at the upper end thereof and having a base 15 with a plurality of legs 16, 17, and 18 extending radially from the base. The music desk 12 is rotationally mounted to the upper end of the column member by a pivot mounting, shown at 20, whereby the music desk can be positioned as shown in the drawings preparatory to storage of a stand in the cart. In actual use of the music stand, the music desk is rotated in a counterclockwise direction, as viewed in FIG. 3, about the pivot mounting 20 to a position wherein a flange 21 extends along the lower edge of the music desk for support of sheets of music or other material.

The storage cart is constructed to provide a storage plane for a series of music stands carried by the cart, with the music stands each held in generally upright relation and stacked on an incline, as shown particularly in FIG. 3. The storage cart has a frame which supports upper and lower pairs of support members, in the form of rods, which define the storage plane and with the storage plane opening to one end of the storage cart. More particularly, the lower pair of rods 25 and 26 extend from end to end of the frame and are inclined from one end of the frame to the other at an angle of approximately thirty degrees (30°) to the horizontal. The rods 25 and 26 are spaced apart a distance slightly greater than the thickness of a music stand leg 18 whereby, as shown in the drawings, leg 18 can extend downwardly between the rods and with the music stand base 15 and the legs 16 and 17 being supported at the upper side of the rods 25 and 26. The upper pair of rods 30 and 31 are positioned above the lower pair of rods in parallel relation therewith on an incline and with the space between these rods being slightly greater than the thickness of the music stand column member 11 whereby the upper and lower pairs of rods have the horizontal space therebetween defining the aforesaid storage plane and which is a plane in which the stand and column members are positioned when stored in the cart.

In FIG. 1, a music stand M' is shown in broken line, representing a stand positioned a substantial distance from the stand M and showing the elevation of the stand stored in an intermediate position relative to the one at the lowermost level in the cart. A series of stands are disposed between stands M and M' and are not shown in FIG. 1. There are two stands shown in FIG. 3 which illustrates the nested relation of adjacent stands when stored in the cart and which shows the upwardly-inclined relation of the stacked stands. FIG. 3 also shows a further stand positioned at the entry end of the cart, with an arrow 35 indicating the path of travel of the last-mentioned music stand toward a storage position adjacent the nested music stands shown in FIG. 3.

The upper and lower pairs of rods are supported at their ends to opposite ends of the frame having upright frame sections. One end of the frame has a pair of vertical members 40 and 41, each having a floor-engaging roller 42 and 43 at the lower end thereof which are mounted for swiveling movement to facilitate steering of the cart. The vertical members 40 and 41 are tubular members and, at their upper ends, telescopically receive outwardly and downwardly-turned ends 45 and 46 of the ends of the upper pair of rods 30 and 31. With this construction of the outwardly-turned ends of the rods 30 and 31, there is a clear access to the storage plane for the column members 11 of the music stands. The vertical members 40 and 41 of the end frame are strengthened by a cross-member structure including a pair of cross-members 50 and 51 which are in vertically-spaced relation and which are generally U-shaped to have ends 50a and 50b and 51a and 51b which extend in contact with the vertical members 40 and 41 and are fastened thereto by suitable fasteners, as indicated at 52. The upper cross-member 50 supports the uppermost ends of the lower rods 25 and 26 by the last-mentioned rods having downturned ends 55 and 56 which are shaped to have terminal parts extending along the length of the upper cross-member 50 for connection thereto by fasteners 57. The downturned ends 55 and 56 of the lower pair of rods result in lifting the entry end of the rods up sufficiently high above the upper cross-member 50 whereby the leg 18 of the music stand is clear to enter into the storage plane without contact with the upper cross member 50, as seen in FIG. 3.

The opposite end of the storage cart has an end frame with a pair of vertically-extending members 60 and 61, each of which has a floor-engaging roller 62 and 63 rotatably mounted at the lower end thereof to coact with the rollers 42 and 43 in providing mobility for the cart. The upper ends of the vertically-extending members 60 and 61 are turned inwardly toward each other and have an upward extent, as shown at 64 and 65, for telescopically engaging downturned ends 66 and 67, respectively, of the upper pair of rods 30 and 31. The vertical members 60 and 61 are interconnected for rigidity by a U-shaped cross-member 70 having upturned ends 71 and 72 which are connected to the vertical members 60 and 61 by fasteners 73. The lower pair of rods 25 and 26 have ends adjacent the cross-member 70 which extend generally horizontally to a connection point with the cross-member 70. These lower ends are shown at 80 and 81 and have bent ends extending parallel and in contact with the cross-member 70 for connection thereto by fasteners, as shown at 82.

Stop members 90 and 91 are extended between the lower and upper pairs of rods, respectively, to establish a position for the lowermost stand stored in the cart and as best seen in FIG. 3. The stop member 90 engages the underside of the stand leg 18 which extends downwardly between the rods 25 and 26 and the upper stop member 91 engages the column member 11 of the stand. This controls the generally upright position of the stand and of successive stands that are carried by the cart in nested relation. The stop members 90 and 91 are located at a sufficient distance from an end of the frame whereby the music stand legs 16 and 17 do not extend beyond an end of the cart.

To facilitate movement of stands into and out of the cart and to prevent marring thereof, the upper and lower pairs of rods have a tubular member covering the major length thereof with the tubular members being identified at 25', 26', 30' and 31'.

With the structure disclosed, it is seen that a plurality of music stands can be stored in nested relation by means of a cart having a width dimension substantially no greater than the width of the widest part of the music stand and having a length which is substantially filled with nested stands held on an incline. In a commercial embodiment of the storage cart, a cart which is approximately five feet in length can hold a range of 18–24 music stands, depending on the particular construction thereof. The uppermost stand in storage, such as a stand positioned close to the position shown for the stand at the left in FIG. 3, has its top at a height from the floor of approximately five feet. This results in storage of a substantial number of stands, with the cart still having the capability of moving through doorways and moving onto relatively small elevator platforms.

The stands, when in storage, cannot be removed from the cart except from the upper end of the storage plane. Placing of a lock across the upper ends of the upper pair of rods 30 and 31 can secure the stands within the cart.

The upper and lower pairs of rods are located centrally of the width of the cart, as seen particularly in FIG. 2, which enables nesting of two of the storage carts when not in use. Two carts are positioned in side-by-side relation with their higher ends opposite to each other and then shifted laterally toward each other.

We claim:

1. A storage cart for music stands comprising, a frame having floor-engaging rollers for cart mobility, a lower pair of spaced-apart rods extending lengthwise of the frame between the ends thereof and inclined relative thereto, an upper pair of spaced-apart rods overlying the lower pair of rods and extending lengthwise of the frame and inclined relative thereto to be in parallel relation with the lower pair of rods, said pairs of rods having the space therebetween defining a vertical storage plane which is exposed to an end of the frame at the upper ends of said rods to permit entry of a music stand from an end of the frame into said storage plane with a column member of a stand between the upper pair of rods and a leg of a music stand base between the lower pair of rods.

2. A storage cart as defined in claim 1 wherein said pairs of rods are inclined at an angle of approximately thirty degrees.

3. A storage cart as defined in claim 1 wherein said pairs of rods are covered with a material to facilitate movement of the stands along the inclined rods without marring the stands.

4. A storage cart as defined in claim 1 wherein said pairs of rods support a stand with a part of the stand captured between the upper and lower pairs of rods whereby a stand can only be removed from the cart by movement toward said end of the frame.

5. A storage cart for music stands having a column member extending upwardly from a base with a plurality of legs radiating from the base comprising: a frame with end members; upper and lower pairs of spaced-apart elongate support members which are inclined along their length, said pairs of support members defining an upright storage plane for one or more music stands with a stand column member positioned between the upper pair of support members, with one or more legs resting on the lower pair of support members and one of said legs positioned therebetween; each pair of support members being supported at one end thereof on one of the end members to provide an unobstructed entry opening to said storage plane at the higher ends of said support members; and means associated with each pair of support members adjacent their lower ends to block the storage plane and cause a stand to maintain a generally upright storage position in the cart.

6. A cart for storing music stands on an incline, the music stand having a column member supporting a music desk and extending upwardly from a base with a plurality of legs radiating from the base comprising, a frame with end members, upper and lower pairs of spaced-apart elongate support members which are inclined along their length at an angle of approximately thirty degrees, said pairs of support members defining an upright storage plane for one or more music stands with a stand column member positioned between and the music desk above the upper pair of support members and one of said base legs positioned between the lower pair of support members, each pair of support members being supported on one of the end members to provide an entry opening to said storage plane at the higher ends of said support members, and the pairs of support members adjacent their lower ends having means to cause the lowermost music stand to maintain a generally upright storage position in the cart.

7. A storage cart for storing on an incline music stands having a column member and a base with radial legs comprising, a frame, a lower pair of rods spaced apart a distance slightly greater than a leg of the stand and extending lengthwise of the frame between the ends thereof and inclined relative thereto at an angle of approximately thirty degrees, an upper pair of rods spaced apart a distance slightly greater than the width of the column member and overyling the lower pair of rods and extending lengthwise of the frame and inclined relative thereto to be in parallel relation with the lower pair of rods, said pairs of rods having the space therebetween defining a vertical storage plane which is open to an end of the frame at the upper ends of said rods to permit entry of a music stand from an end of the frame into said storage plane with a column member of a stand between the upper pair of rods, a leg of a music stand base extending downwardly between the lower pair of rods, and additional legs of said music stand base resting on said lower pair of rods, and stop members positioned between said pairs of rods adjacent their lower ends to define a position for the lowermost stand stored in the cart.

8. A music stand cart for storing a plurality of music stands in upright position along an incline and with the stand having a column member and a base with a plurality of radially-extending legs, said cart comprising, a frame with a pair of vertical members at opposite ends and each vertical member having a floor-engaging roller for cart mobility, cross-members extended between said pairs of vertical members and being at different heights, a lower pair of rods spaced apart a distance slightly greater than the thickness of a music stand legs and being inclined from end to end of the frame, an upper pair of rods overlying the lower pair of rods and in parallel relation thereto and spaced apart a distance slightly greater than the thickness of the stand column member, said upper pair of rods having their upper ends turned outwardly to connect to a pair of the vertical members whereby there is free entry from an end of the frame of a stand column member to a vertical storage plane defined by the pairs of rods, said lower pair of rods having downturned ends overlying the higher of the cross-members to extend downwardly for connection to the underlying cross-member which provides a clear path of movement of the legs of the music stand as the music stand moves into the storage plane with one leg extending downwardly between the lower pair of rods, and stop members extended between the upper and lower pairs of rods for establishing the position of the lowermost of the stored music stands, said stop members being at a sufficient distance from an end of the frame to prevent the lowermost stand extending outwardly beyond the end of the frame.

9. A cart as defined in claim 8 wherein said pairs of vertical members are spaced apart a distance approximately equal to the width of a music desk of the music stand, and said upper and lower pairs of rods are positioned centrally of the space between said vertical members.

10. A cart as defined in claim 9 wherein said upper and lower pairs of rods are inclined at an angle of approximately thirty degrees.

* * * * *